Oct. 30, 1923.
E. BERLINER
HELICOPTER
Original Filed Oct. 4, 1918
1,472,148
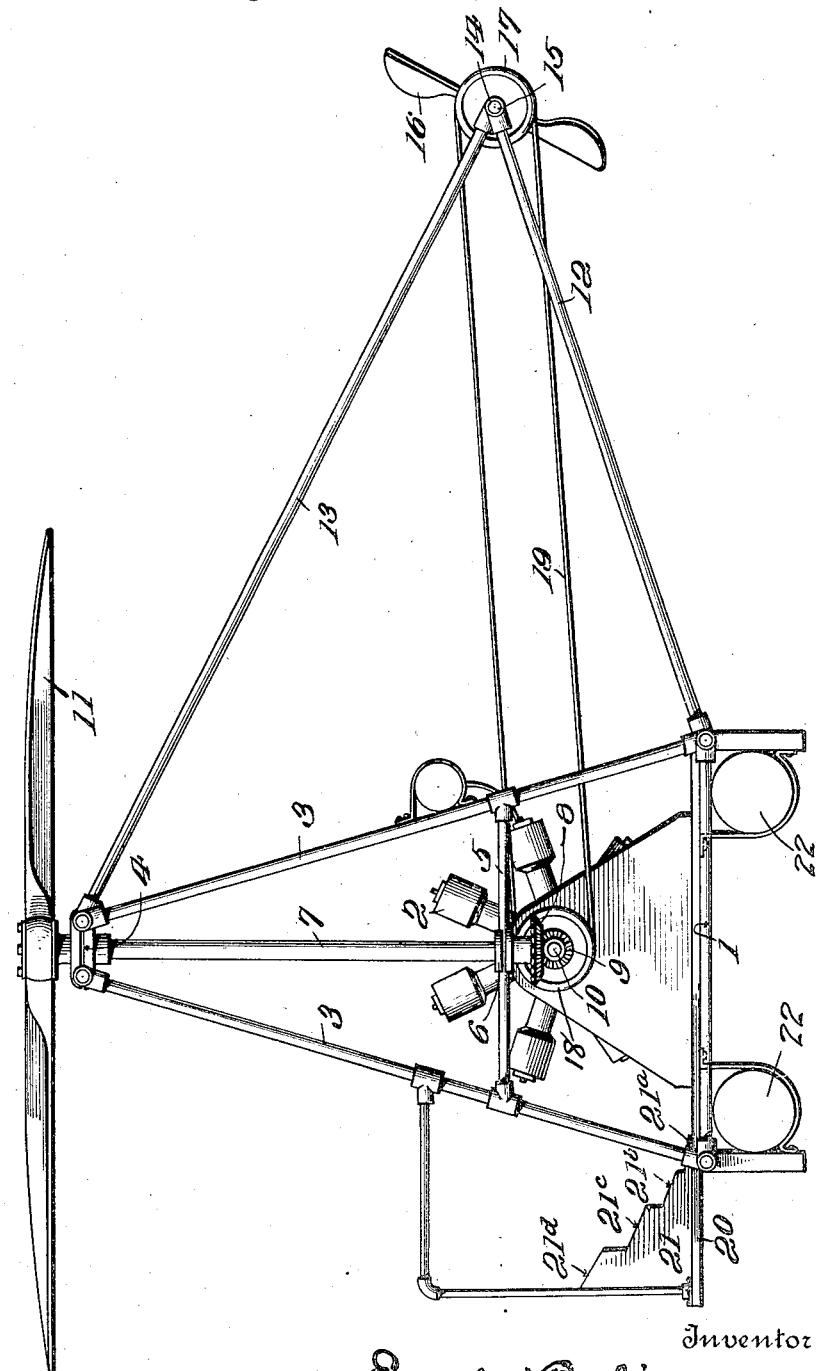
Inventor
Emile Berliner
By Sturtevant & Mason
Attorneys Patented Oct. 30, 1923.

1,472,148

UNITED STATES PATENT OFFICE.

EMILE BERLINER, OF WASHINGTON, DISTRICT OF COLUMBIA.

HELICOPTER.

Application filed October 4, 1918, Serial No. 256,843. Renewed May 3, 1922. Serial No. 558,313.

*To all whom it may concern:*

Be it known that I, EMILE BERLINER, a citizen of the United States, residing at Washington, in the District of Columbia, have invented certain new and useful Improvements in Helicopters, of which the following is a description, reference being had to the accompanying drawing, and to the figures of reference marked thereon.

The invention relates to new and useful improvements in helicopters. In my prior patent granted August 31st, 1915, No. 1,152,268, I have shown and described a helicopter lifted by two propellers rotating in opposite directions. One propeller counteracts the torque incident to the rotation of the other and prevents a slow rotating movement of the helicopter as a whole as it ascends. There are, however, certain disadvantages in the use of two propellers closely associated, as the interference of one with the other causes more or less of an intermittently lifting force.

An object of the present invention is to provide a helicopter having a single lifting propeller or lifting propellers all rotating in the same direction, with an air pressure means for counteracting the torque of the driving shaft and propeller or propellers.

A further object of the invention is to provide an improved means of directing the upward movement of the helicopter.

In the drawings I have shown more or less diagrammatically and in side elevation, one embodiment of my invention.

The invention consists broadly of a supporting frame on which is mounted a suitable motor. Also carried by the frame is a vertically disposed shaft which is connected to the motor so as to be rotated thereby. This vertical shaft carries a propeller. As the propeller rotates, the helicopter will be lifted. Extending outwardly from the helicopter is a supporting frame on which is mounted an air pressure device connected to and actuated by the motor. This air pressure device is preferably in the form of a small rotating propeller. The air pressure device is so disposed relative to the main frame of the helicopter, that it produces a horizontal air pressure for counterbalancing the torque of the driving shaft and the propeller of the helicopter.

Referring more in detail to the drawings, I have shown my invention as embodied in a helicopter consisting of a main supporting base 1, on which is mounted a motor 2. Extending upwardly from the supporting base 1 are frame members 3, 3. These frame members 3, 3, carry a bearing 4 at the upper end thereof. Cross members 5 carry a bearing 6 and mounted in the bearings 4 and 6 is a vertical shaft 7. This shaft 7 carries a gear wheel 8 at the lower end, which meshes with a gear wheel 9 on the shaft 10, which is actuated from the motor. Mounted on the upper end of the shaft 7 is a propeller 11, which may be of the usual construction.

Extending outwardly from the supporting frame and base 1 is an auxiliary frame consisting of side members 12 and 13 which are joined at their outer end to a bearing 14. Mounted to rotate in the bearing 14 is a shaft 15, carrying a small propeller 16. Mounted on the shaft 15 is a pulley 17. Also mounted on the motor shaft 10 is a pulley 18 and a belt 19 running over these pulleys 17 and 18 causes the propeller 16 to be actuated from the motor. The propeller 16 is driven in such a direction that it produces a horizontal air pressure in a proper direction to counterbalance the torque of the driving shaft and propeller carried thereby. As the vertical shaft and the propeller 11 rotate, there will be a certain torque incident thereto which will tend to cause the frame of the helicopter to rotate slowly. This torque tending to rotate the frame of the helicopter will be perfectly counterbalanced by the auxiliary propeller 16, which rotates in a direction tending to produce a torque or movement of the frame of the helicopter in a direction opposed to that caused by the torque incident to the rotation of the vertical shaft 7 and the propeller 11. Instead of a single propeller, two propellers may be used, rotating in the same direction, and a similar means utilized for counterbalancing the torque incident to the rotation of the propellers. The small propeller 16 is located at some distance from the center of the helicopter, and, therefore, this propeller may be made very small owing to this large leverage and still perfectly counteract the torque of the vertical shaft and lifting propeller. Suitable means may be provided for decreasing the speed of the auxiliary propeller 16 or for stopping the same, which means would, of course, be within the ready control of the operator. This will permit the horizontal air pressure caused by said propeller to be varied or to cease at the will of the operator.

As a means for directing the upward flight of the helicopter, I have provided a laterally extending framework 20 carrying a series of steps 21. Each step is inclined and the successive steps in an upward direction are inclined to a slightly greater extent to the vertical.

The operator preferably stands at the left of the motor and the parts are so arranged that when the operator stands in this position the parts of the helicopter will be balanced so the shaft 7 will stand vertically and the helicopter will move upwardly in a vertical direction. If the operator moves back on to the first step, indicated at 21ª, the helicopter will be thrown slightly out of vertical balance and the shaft 7 caused to incline slightly toward the operator and this will cause the helicopter to move upwardly, but in a direction inclined to the vertical, depending upon the inclination of the shaft 7. If the operator moves back on to the step 21ᵇ, the helicopter will be inclined to a further extent and likewise when the operator moves on to the steps 21ᶜ and 21ᵈ. The steps are inclined to different degrees, so that each one is substantially horizontal when the operator stands thereon.

By varying the speed of the auxiliary propeller the helicopter may be turned about its vertical axis. This movement of the helicopter in conjunction with the inclining of the vertical axis, will allow the helicopter to be directed as desired by the operator. Attention is called to the fact that the auxiliary frame, consisting of the side members 12 and 13, extends outwardly from the main frame to a point at some distance beyond the extreme outer limits of the lifting propeller and, therefore, the point at which the power is applied by the auxiliary propeller is some distance from the axis of the helicopter which gives a long leverage for said applied controlling power. This is a great advantage in a helicopter for the reason that it is desirable that just as much as possible of the generated power be used for lifting purposes, and by this long leverage the power necessary to operate the auxiliary propeller is reduced to a minimum. Then again, it is noted that this auxiliary propeller may be slowed down as to speed or stopped for the purpose of guiding the direction of flight of the helicopter, and by having the auxiliary propeller located at some distance from the axis of the helicopter, the power for shifting the helicopter to control the flight can be very much more gradually applied. That is to say, when the propeller shifts horizontally through a considerably distance, the angle through which the helicopter is turned will be still comparatively small. It is, of course, desirable in changing the direction of flight that this change should be gradual, and this can be readily accomplished through the control of the auxiliary propeller located at this relatively long distance from the axis of the helicopter.

Attached to the supporting base 1 are air cylinders 22 which are of sufficient capacity and so disposed as to support the helicopter on the surface of the water.

It is obvious that minor changes in the details of construction may be made, without departing from the spirit of the invention as set forth in the appended claims.

Having thus described my invention, what I claim as new and desire to secure by Letters Patent, is:—

1. A helicopter including in combination, a supporting frame, a motor carried thereby, a vertical shaft mounted in the frame and actuated by the motor; a horizontal lifting propeller carried by said shaft, an air pressure device located at one side of the frame and actuated by the vertical shaft for producing horizontal air pressure which will counterbalance the torque of the driving shaft and propeller, a laterally projecting frame on which the operator may move back and forth from the center of the helicopter for inclining the vertical shaft to direct the flight of the helicopter, said laterally projecting frame having a series of inclined steps for the operator.

2. In a helicopter, a laterally projecting frame on which the operator may move back and forth from the center of the helicopter for inclining the vertical shaft to direct the flight of the helicopter, said laterally projecting frame having a series of inclined steps for the operator.

In testimony whereof, I affix my signature.

EMILE BERLINER.